(12) United States Patent
Wang

(10) Patent No.: US 8,747,160 B2
(45) Date of Patent: Jun. 10, 2014

(54) MEMORY CARD MODULE WITH ELECTROMAGNETIC RADIATION SHIELD

(75) Inventor: Jun-Wei Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 28 days.

(21) Appl. No.: 13/557,192

(22) Filed: Jul. 24, 2012

(65) Prior Publication Data

US 2013/0337686 A1    Dec. 19, 2013

(30) Foreign Application Priority Data

Jun. 15, 2012  (CN) ........................... 2012 1 0197878

(51) Int. Cl.
*H01R 13/648*    (2006.01)
(52) U.S. Cl.
USPC ...................................... 439/607.31; 439/327
(58) Field of Classification Search
USPC .............. 439/325, 327, 328, 607.05, 607.13, 439/607.14, 607.31, 630
See application file for complete search history.

(56) References Cited

U.S. PATENT DOCUMENTS

| 5,580,257 A * | 12/1996 | Harwath ....................... 439/108 |
| 6,319,037 B1 * | 11/2001 | Lai ................................ 439/327 |
| 6,394,831 B1 * | 5/2002 | Bowers et al. ................. 439/327 |
| 7,287,996 B1 * | 10/2007 | Shing ............................ 439/327 |
| 7,371,097 B1 * | 5/2008 | Pennypacker et al. ......... 439/327 |
| 7,985,086 B1 * | 7/2011 | Sun ............................... 439/157 |
| 8,231,411 B1 * | 7/2012 | Westman et al. ......... 439/607.05 |

* cited by examiner

*Primary Examiner* — Thanh Tam Le
(74) *Attorney, Agent, or Firm* — Novak Druce Connolly Bove + Quigg LLP

(57) ABSTRACT

A memory card module includes a memory card, a socket including a connecting portion and a main body protruding from the connecting portion, two locking members, and a shielding member made of electromagnetic shielding material. The shielding member covers the memory card and the main body. The locking members are pivotably attached to opposite sides of the main body respectively. Each locking member includes a locking portion. The shielding member includes a top plate, two end plates extending down from opposite ends of the top plate, and two side plates extending down from opposite sides of the top plate. A number of vents are defined in each end plate. A block protrudes from each side plate. The locking portion of each locking member abuts against the block of the corresponding side plate, to mount the shielding member to the socket.

5 Claims, 3 Drawing Sheets

MEMORY CARD MODULE WITH ELECTROMAGNETIC RADIATION SHIELD

BACKGROUND

1. Technical Field

The present disclosure relates to a memory card module able to prevent electromagnetic radiation leakage.

2. Description of Related Art

Many memory cards in electronic devices, such as a computer or a server, generate electromagnetic radiation, which makes controlling of the electromagnetic radiation shielding of the electronic device difficult.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
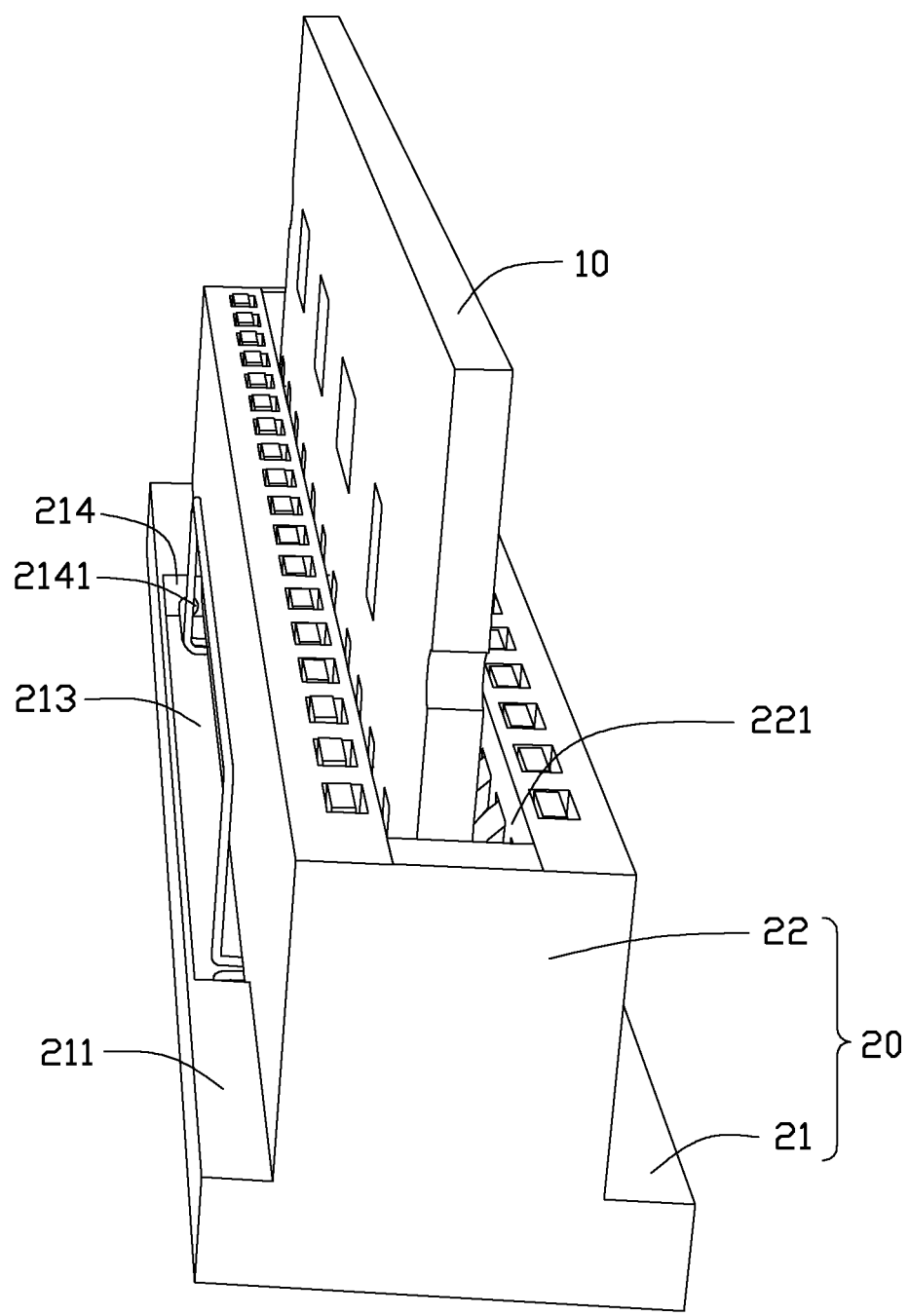
FIG. 1 is an assembled, isometric view of a memory card inserted in a socket of an exemplary embodiment of a memory card module.
Figure 2:
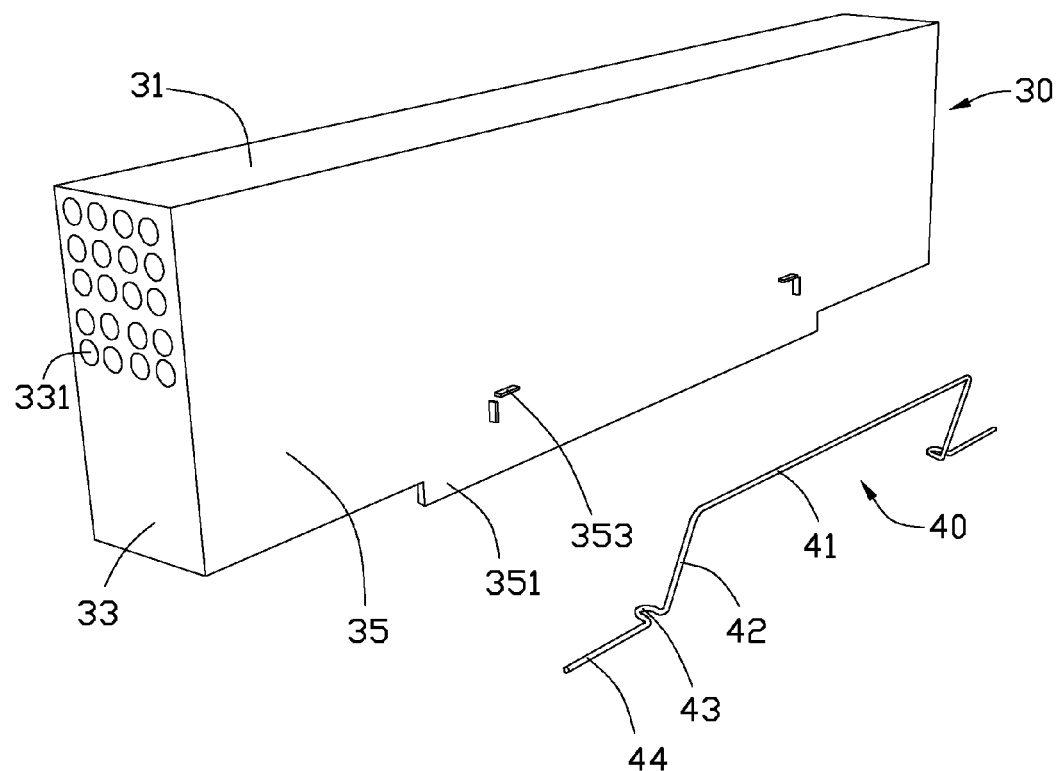
FIG. 2 is an exploded, isometric view of a shielding member and a locking member of the memory card module.

FIGS. 1 and 2, illustrate an exemplary embodiment of a memory card module. The memory card module includes a memory card 10, a socket 20, a shielding member 30, and two locking members 40.

The socket 20 is substantially T-shaped, and includes a connecting portion 21, capable of electrically connecting to a circuit board (not shown), and a main body 22, protruding up from the connecting portion 21 and defining a memory card slot 221 in which the memory card 10 can be inserted. The connecting portion 21 includes two stepped portions 211 respectively located at opposite sides of the main body 22. An elongated slot 213 is defined in a top of each stepped portion 211, extending along a direction parallel toward the memory card slot 221. A pivot hole 2141 is defined in each end wall 214 bounding the slot 213.

The shielding member 30 is substantially box-shaped, defining an opening (not shown) in a bottom. The shielding member 30 includes a top plate 31, two end plates 33 perpendicularly extending down from opposite ends of the top plate 31, and two side plates 35 perpendicularly extending down from opposite sides of the top plate 31. A plurality of vents 331 is defined in each end plate 33. A diameter of each vent 331 is less than or equal to 4 millimeters. A flange 351 extends down from a middle of a bottom side of each side plate 35. Two pairs of blocks 353 protrude out from each side plate 35. The blocks 353 of each pair are substantially arranged in L shape. The shielding member 30 is made of electromagnetic shielding material, such as steel.

Each locking member 40 is formed by bending a resilient metal wire. Each locking member 40 includes a locking portion 41; two connecting poles 42, perpendicularly extending from opposite ends of the locking portion 41; two U-shaped pressed portions 43, extending from distal ends of the connecting poles 42 opposite to the locking portion 41; and two pivot portions 44, extending from distal ends of the pressed portions 41 opposite to the corresponding connecting poles 42.

Figure 3:
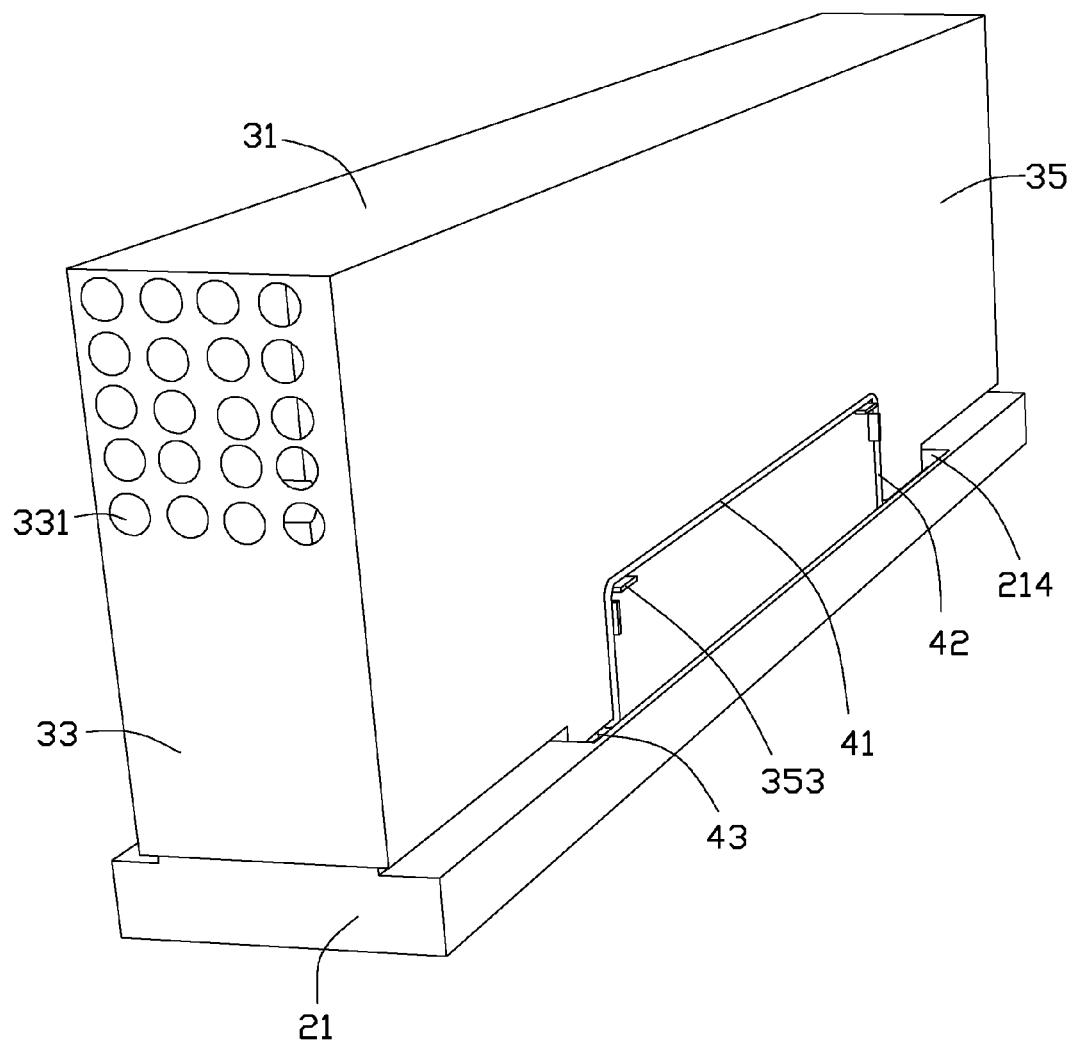
FIG. 3 is an assembled, isometric view of the memory card module.

FIG. 3, shows that, in assembly, the pivot portions 44 of each locking member 40 are pivotably inserted in the pivot holes 2141 of a corresponding slot 213. The shielding member 30 covers the memory card 10 inserted in the memory card slot 221 and the main body 22. The flanges 351 are inserted in the corresponding slots 213. Each flange 351 presses the corresponding pressed portion 43 to rotate the corresponding locking portion 41 toward the corresponding side plate 35, until the locking portion 41 and the connecting poles 42 abut against outer surfaces of the blocks 353. Thus, the shielding member 30 is mounted to the socket 20. The shielding member 30 prevents electromagnetic radiation generated by the memory card 10 leakage. The vents 331 are used for airflow extending through to cool the memory card 10.

Even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A memory card module comprising:
   a memory card;
   a socket comprising a connecting portion and a main body, protruding up from the connecting portion; the main body defining a memory card slot, in which the memory card is inserted; wherein the connecting portion comprises two stepped portions respectively located at opposite sides of the main body;
   two locking members pivotably attached to the stepped portions respectively, wherein each locking member comprises a locking portion; and
   a shielding member comprising electromagnetic shielding material, wherein the shielding member covers the memory card and the main body, the shielding member comprises a top plate, two end plates extending down from opposite ends of the top plate, and two side plates, extending down from opposite sides of the top plate; wherein a plurality of vents is defined in each end plate, and each side plate forms a block;
   wherein the locking portion of each locking member abuts the block of the corresponding side plate, to mount the shielding member to the socket.

2. The memory card module of claim 1, wherein an elongated slot is defined in a top of each stepped portion and extends along a direction parallel to the memory card slot, a pivot hole is defined in each end wall of the elongated slot, and the corresponding locking member is pivotably attached to the pivot holes of the corresponding slot.

3. The memory card module of claim 2, wherein each of the locking members further comprises two connecting poles perpendicularly extending from opposite ends of the locking portion, two substantially U-shaped pressed portions extending from distal ends of the connecting poles opposite to the locking portion, and two pivot portions extending from distal ends of the corresponding pressed portions opposite to the corresponding connecting poles; and the pivot portions are pivotably inserted in the pivot holes of the corresponding slot.

4. The memory card module of claim 3, wherein a flange extends down from a middle of a bottom side of each side plate, when each flange is inserted in the corresponding slot, the flange presses the corresponding pressed portion to rotate the corresponding locking portion toward the corresponding side plate, until the locking portion abuts against the block of the corresponding side plate, to mount the shielding member to the socket.

5. The memory card module of claim 3, wherein each of the locking members is a bent resilient metal wire.

* * * * *